United States Patent Office 3,189,539
Patented June 15, 1965

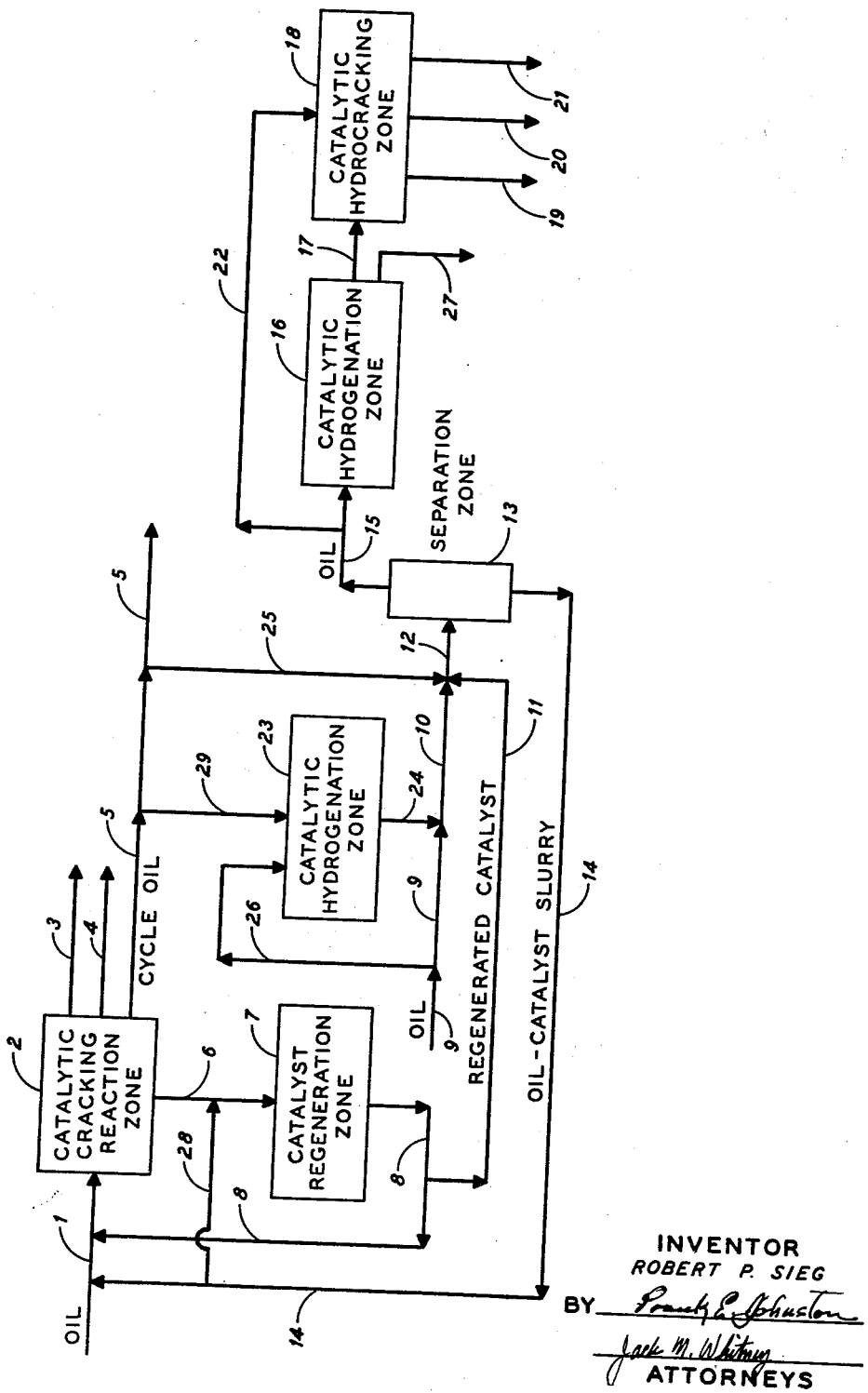

3,189,539
REMOVAL OF NITROGEN COMPOUNDS FROM HYDROCARBON OILS BY ADSORPTION ON CRACKING CATALYST
Robert P. Sieg, Piedmont, Calif., assignor to California Research Corporation, San Francisco, Calif., a corporation of Delaware
Filed May 14, 1962, Ser. No. 194,254
2 Claims. (Cl. 208—254)

This invention relates to processes for the removal of contaminating nitrogen compounds from hydrocarbon oils. More particularly, the invention relates to processes for the removal of nitrogen compounds from a hydrocarbon oil by adsorption of the nitrogen compounds on a cracking catalyst.

In one embodiment the invention comprises a combination of a catalytic cracking process and a catalytic hydrogenation process, wherein nitrogen compounds are removed from the feed to the catalytic hydrogenation process by adsorption on a slip stream of regenerated catalyst from the catalytic cracking process.

The removal of contaminating nitrogen compounds from a hydrocarbon oil is known to improve the properties of the oil in many respects. For example, the color is usually improved, thereby enhancing the market value of a salable oil. Also the oil is made more amenable to further processing such as catalytic reforming, hydrocracking, and hydrogenation. It is especially desirable to reduce the nitrogen content of a hydrocarbon oil to a very low value to prepare a feed for an acidic catalytic hydrocracking process. The lower the nitrogen content of the oil, the lower the temperature and pressure which may be employed in the hydrocracking process and the longer the catalyst life will be.

It is known that nitrogen compounds can be removed from oils by adsorption on solid contact agents. However, previous attempts to accomplish substantial denitrification by selective adsorption have proved to be uneconomic for various reasons. In processes heretofore proposed the loss of valuable hydrocarbons adsorbed or entrained with the nitrogen compounds on the adsorbent has been excessive. The cost of cyclic processes wherein it is attempted to recover these hydrocarbons from the adsorbent by elution or chemical treatment has been excessive, and adsorbent life has been unsatisfactorily short.

It is an object of this invention to provide a process for the removal of nitrogen compounds from hydrocarbon oils by adsorption wherein there is little or no loss of hydrocarbon oil, which process is inexpensive to operate, and which uses a rugged, low cost, adsorbent.

Another object is to provide a combination of a catalytic cracking process and an adsorption process, wherein cracking catalyst is used both to crack hydrocarbon oils in the cracking process and to denitrify another hydrocarbon oil in the adsorption process, and the cracking process provides the means for removing the adsorbed nitrogen compounds from the catalyst, without adversely affecting the operation of the cracking process.

Another object is to supplement catalytic hydrogenation processes for the removal of nitrogen compounds from a hydrocarbon oil by removing a substantial portion of the nitrogen compounds from the oil by adsorbing them on a portion of cracking catalyst withdrawn from a catalytic cracking process, and then reusing the catalyst for cracking other oils.

In accordance with the invention nitrogen compounds are removed from a hydrocarbon oil by adsorbing said compounds on a solid adsorbent, using as the adsorbent a minor portion of freshly regenerated cracking catalyst withdrawn from a catalytic cracking process having a reaction zone and a regeneration zone between which the catalyst is continuously circulated, and returning the catalyst having nitrogen compounds adsorbed thereon to the catalytic cracking process. The hydrocarbon oil treated should boil below about 750° F., or it should contain below about 200 p.p.m. nitrogen initially. Preferably, the feed is restricted with respect to both of these factors.

In this way the catalytic cracking process provides the sole means for removing adsorbed nitrogen compounds from the adsorbent and for providing adsorbent free of nitrogen compounds to the adsorption step. Hence, the nitrogen removal is very economically accomplished because a continuous noncyclic process can be used and there is no need to provide separate facilities for adsorbent elution or regeneration. Since only a minor portion of the cracking catalyst is involved, generally less than 5% of the circulating catalyst, the operation of the catalytic cracking process is not adversely affected. The cracking catalyst is known to be very rugged, and it is a good adsorbent for nitrogen compounds.

The process of this invention comprises the steps: (1) withdrawing a portion of freshly regenerated cracking catalyst from a catalytic cracking process, (2) contacting a liquid hydrocarbon oil containing nitrogen compounds with said portion of regenerated cracking catalyst at conditions at which a substantial portion of the nitrogen compounds is adsorbed on the catalyst, (3) separating the catalyst carrying adsorbed nitrogen compounds from catalyst-free oil reduced in nitrogen content, (4) returning said catalyst to said catalytic cracking process, and (5) recovering said catalyst-free oil reduced in nitrogen content.

In a preferred embodiment, after contacting the oil and the catalyst, a slurry of oil and catalyst carrying adsorbed nitrogen compounds is separated from catalyst-free oil reduced in nitrogen content. This oil-catalyst slurry is returned to the reaction zone of the catalytic cracking process. The oil entrained with or adsorbed on the cracking catalyst is thereby recovered by cracking to valuable products in the catalytic cracking process. The catalyst-free oil reduced in nitrogen content is passed to a catalytic hydrogenation zone wherein additional nitrogen compounds are removed by hydrogenation to ammonia, and/or hydrocarbons contained in the catalyst-free oil are hydrocracked to lower-boiling hydrocarbons.

The attached drawing is a block flow diagram illustrating certain preferred embodiments of the invention. Reference thereto will also be helpful in explaining the basic features of the invention.

Referring to the diagram, there is shown a catalytic cracking process of conventional design, comprising a catalytic cracking reaction zone 2 and a catalyst regeneration zone 7. Operating conditions and equipment used in the reaction zone and regeneration zone are well known, and need not be reiterated here as the conditions are not noticeably altered by the practice of this invention. Catalyst is continuously circulated between the reaction zone and the regeneration zone by passing spent catalyst from the reaction zone to the regeneration zone through line 6 and by passing regenerated catalyst through line 8 back to the reaction zone. As shown, the regenerated catalyst is usually returned to the reaction zone in admixture with the hydrocarbon oil feed to the catalytic cracking process in line 1. Usually, there are several product streams recovered from the catalytic cracking reaction zone, including light gases, represented by line 3; gasoline, represented by line 4; and one or more cracked cycle oils, represented by line 5.

Any suitable active cracking catalysts may be employed in the catalytic cracking process. Usually a synthetic silica-alumina, an acid activated clay catalyst, or a silica-magnesia composite is used. The catalyst may be in the powdered or fluidizable size range and be circulated by means of lift gases such as the regeneration air and the hydrocarbon oil feed. Alternately, the thermofor type of catalytic cracking may be employed wherein a catalyst of larger dimensions is mechanically conveyed between the reaction zone and the regeneration zone. For best results in the practice of this invention it is preferred to use a silica-alumina cracking catalyst.

In accordance with the invention a minor portion of the freshly regenerated cracking catalyst in line 8 is withdrawn through line 11. This withdrawn portion of catalyst is used as the adsorbent to remove contaminating nitrogen compounds from a liquid hydrocarbon oil. For example, such a hydrocarbon oil is introduced through line 9 and passed through line 10. The oil and catalyst then mix forming a slurry in line 12 and pass to separation zone 13. Suitable conditions for adsorption are achieved in line 12 and maintained in separation zone 13 whereby a substantial portion of the nitrogen compounds initially contained in the liquid hydrocarbon oil is adsorbed on the catalyst. The conditions should provide for intimate contacting of the oil and the catalyst for a sufficient time for adsorption of at least 10% of the nitrogen compounds, at a temperature at which the oil is in the liquid phase.

The adsorption is carried out at conditions at which cracking does not occur, and there is not other chemical conversion of the oil or constituents therein to any significant extent. Regenerated catalyst in line 8 is normally at a temperature of about 1000–1100° F. The portion of catalyst withdrawn in line 11 should be cooled to below the temperature at which cracking would occur on contacting the oil in line 12, i.e., below about 900° F. Sufficient cooling may be accomplished, for example, by heat losses to the atmosphere in line 11, by providing for intermediate storage in line 11, or by using a relatively cool inert gas to move the catalyst (if of fluidizable size) through line 11. The quenching effect of contact with the nitrogen-containing oil in line 12 further adjusts the temperature to the desired range. Best results are obtained if the temperature is maintained below about 400° F. The adsorption is quite rapid initially, and consequently the bulk of the adsorption occurs in the first few minutes of contacting. The average contacting time need not exceed about one hour, including the separation time.

The ratio of catalyst to oil selected depends to some extent on the properties of the oil, such as its boiling point and its initial nitrogen content. However, I have found that, when using as the adsorbent a cracking catalyst in accordance with this invention, the bulk of the adsorbable nitrogen compounds can be adsorbed using a weight ratio of catalyst to oil of less than about 0.1. The use of a low catalyst-to-oil ratio is especially preferred because the cost of moving the catalyst adsorbent is thereby minimized, the separation of oil and catalyst is simplified, and a higher yield of oil reduced in nitrogen content is obtained.

The catalyst having nitrogen compounds adsorbed thereon is separated from the resulting catalyst-free oil reduced in nitrogen content in separation zone 13. Liquid hydrocarbon oil reduced in nitrogen content is recovered from separation zone 13 in line 15. The separation may be accomplished in any of several known ways, including filtration, simple settling in a vessel or pond, or under the influence of centrifugal force. In a preferred embodiment, preferably a slurry of oil and catalyst carrying adsorbed nitrogen compounds is separated from the resulting catalyst-free oil by settling, and the oil-catalyst slurry is returned to the catalytic cracking process, for example, by pumping through line 14. Most advantageously the slurry is returned to the reaction zone of the catalytic cracking process, for example as shown, by mixing with the hydrocarbon oil feed to the cracking process in line 1. The entrained oil and the adsorbed nitrogen compounds are then converted to hydrocarbon products in the reaction zone of the catalytic cracking process, and recovered in lines 3, 4, or 5.

It is also possible to return the catalyst carrying adsorbed nitrogen compounds to the regeneration zone of the catalytic cracking process through line 28 rather than to the reaction zone. Then, however, to minimize the loss of valuable hydrocarbons, the catalyst should be separated from the catalyst-free oil in separation zone 13 by filtration or an equivalent method which provides a substantially dry catalyst rather than a slurry.

In accordance with a preferred embodiment of the invention the recovered catalyst-free oil reduced in nitrogen content, in line 15, is passed to a catalytic hydrogenation zone, such as zone 16, wherein additional nitrogen compounds are removed by hydrogenation to ammonia. Because a substantial portion of the nitrogen compounds have already been removed from the oil, it is found that the remaining nitrogen compounds are much more readily converted to ammonia by catalytic hydrogenation. In zone 16 the oil may be contacted with a sulfactive hydrogenation catalyst at elevated temperature and pressure and in the presence of excess hydrogen in a known manner. Specifically, the oil may be contacted with a cobalt-molybdate or nickel sulfide-molybdenum sulfide or other catalyst comprising one or more oxides or sulfides of metals of groups VI and VIII of the periodic table supported on a carrier, such as alumina, at a liquid hourly space velocity of 0.2–15 LHSV, 500–900° F., 200–5000 p.s.i.g., and in the presence of 1000–15,000 cubic feet of hydrogen per barrel of oil. Nitrogen-free oil is recovered in line 17.

I have found that the removal of nitrogen compounds by adsorption on cracking catalysts is most efficient if the oil has only a moderately high initial nitrogen content, preferably less than about 200 p.p.m. nitrogen. Accordingly, if the nitrogen content is higher, in a preferred embodiment the oil in line 9 is passed through line 26 to catalytic hydrogenation zone 23. In zone 23 the same types of catalysts and operating conditions may be employed as previously described for zone 16. Hydrocarbon oil reduced in nitrogen content is recovered from zone 23 in line 24. The oil then passes through line 10 to mix with the portion of regenerated cracking catalyst in line 11, forming an intimate mixture in line 12 which then passes to separation zone 13. Hydrocarbon oil further reduced in nitrogen content is recovered in line 15. When this material is processed in catalytic hydrogenation zone 16 it is found that the rate at which the nitrogen compounds convert to ammonia at typical operating conditions of 700° F. and 1100 p.s.i.a. hydrogen partial pressure is much greater than the reaction rate at the same conditions in zone 23. For example, after removing about 90% of the nitrogen compounds by catalytic hydrogenation in zone 23, and then removing an additional 40% of the remaining nitrogen compounds by contacting in line 12 and separating in zone 13, the reaction rate in zone 16 is nearly five times as rapid as the reaction rate in zone 23 at the same conditions. The oil in line 15 is thus very easily purified to remove substantially all of the nitrogen compounds therein to produce a nitrogen-free oil in line 17. The nitrogen free oil can then be passed to catalytic hydrocracking zone 18 wherein the oil is hydrocracked to lower boiling hydrocarbon products. The products usually include a gaseous portion recovered in line 19, a light liquid product recovered in line 20, and a heavier liquid product recovered in line 21.

In hydrocracking zone 18 the nitrogen-free oil is contacted with a catalyst comprising a hydrogenation-dehydrogenation component supported on a refractory oxide support having cracking activity. Zone 18 is operated at conditions causing a significant net consumption of hydrogen in excess of 500 standard cubic feet per barrel. Hence, it may also be termed a catalytic hydrogenation zone. With an essentially nitrogen-free oil in line 17, i.e., below 10 p.p.m. nitrogen, it is preferred to use an acidic hydrocracking catalyst such as cobalt or nickel sulfide supported on a cracking catalyst such as silica-alumina. Low temperatures of 500–800° F. may then be employed at pressures of 1000–3000 p.s.i.g. and space velocities of 0.3–15 volumes of oil per volume of catalyst per hour in the presence of 1000–15,000 s.c.f. of $H_2$ per barrel. With a higher nitrogen content in the oil, somewhat higher temperatures of 700–850 are employed in zone 18. A satisfactorily low nitrogen content of 10–100 p.p.m. may be achieved in the oil in line 15. In that case it is often more economical to bypass zone 16 by passing the oil through line 22 directly to zone 18.

With an acidic hydrocracking catalyst in zone 18 the oil feed in line 17 or line 22 tends to be hydrocracked predominantly to gasoline boiling range products. If it is desired to maximize middle distillate products, a catalyst of lesser acidity or a nonacidic catalyst is employed. Catalytic hydrogenation zone 16 ordinarily employs a nonacidic catalyst. Accordingly, zone 16 may be operated under conditions at which hydrocarbons contained in the oil feed in line 15 are hydrocracked to lower boiling hydrocarbons. All or a portion of the cracked products may then be recovered in line 27.

I have found that the removal of nitrogen compounds from liquid hydrocarbon oil by adsorption on cracking catalyst is most efficient as applied to only moderately high boiling oils, i.e., those boiling below about 750° F. Accordingly, a preferred feed stock is the light cycle oil product of the catalytic cracking process recovered in line 5. As shown in the diagram, all or a portion of the cycle oil may be passed through line 25 for contacting in line 12 with the portion of regenerated cracking catalyst withdrawn through line 11. In accordance with a preferred embodiment of the invention all or a portion of the cycle oil in line 5 is passed via line 29 through catalytic hydrogenation zone 23 wherein a major portion of the nitrogen compounds contained in the cycle oil is removed by hydrogenation to ammonia. From zone 23 there is recovered in line 24 liquid hydrogenated oil reduced in nitrogen content. This oil passes through line 10 and is contacted in line 12 with the portion of freshly regenerated cracking catalyst withdrawn from the catalytic cracking process through line 11. In zone 13 a slurry of oil and catalyst carrying adsorbed nitrogen compounds is separated from the resulting catalyst-free oil and returned via line 14 to the reaction zone of the catalytic cracking process. There, the oil entrained with or adsorbed on the catalyst is more readily cracked to valuable products because it has been upgraded in quality as a cracker feed by the catalytic hydrogenation accomplished in zone 23. The catalyst-free oil further reduced in nitrogen content is separated in zone 13 and passed through line 15 to catalytic hydrogenation zone 16 where the remaining nitrogen compounds are easily substantially completely removed by hydrogenation to ammonia. The nitrogen-free oil so obtained is then passed through line 17 to catalytic hydrocracking zone 18 wherein the oil is hydrocracked to lower boiling hydrocarbon products recovered in lines 19, 20, and 21.

The following examples illustrate the use of regenerated cracking catalyst to adsorb nitrogen compounds from liquid hydrocarbon oils and the importance of certain of the aforementioned preferred features in the contacting step. The first example illustrates the removal of nitrogen compounds from a catalytic cracker light cycle oil product using regenerated cracking catalyst as the adsorbent.

*Example I*

A light cycle oil having a gravity of 24.1 degrees API, boiling from 383 to 647° F., and containing 1260 p.p.m. nitrogen, was contacted by mixing with regenerated, equilibrium, fluidized bed catalytic cracker silica-alumina catalyst at 300° F. The catalyst analyzed 81% $SiO_2$ and 18.6% $Al_2O_3$ and had a surface area of 123 $M^2$/gm. and a pore volume of 0.35 cc./gm. After one hour of contacting, the supernatant oil separated from the settled catalyst-oil slurry was found to contain 965 p.p.m. nitrogen. Thus, about 23% of the nitrogen compounds were adsorbed on the cracking catalyst.

The second example shows that the adsorption is much more efficient with a feed having a lower nitrogen content.

*Example II*

The light cycle oil feed of Example I was catalytically hydrogenated to remove the bulk of the nitrogen compounds by conversion to ammonia, and the nitrogen content of the product was then adjusted to 133 p.p.m. by blending with a small portion of unhydrogenated cycle oil. The cycle oil reduced in nitrogen content to 133 p.p.m. was contacted with a portion of the regenerated silica-alumina catalyst at 300° F. at a weight ratio of catalyst to oil of 0.05. After one hour the supernatant catalyst-free oil was found to contain only 83 p.p.m. nitrogen. Thus, about 38% of the nitrogen compounds initially contained in the oil were adsorbed on the cracking catalyst even though a much lower ratio of catalyst to oil was used as compared to Example I. Moreover, there were more moles of nitrogen compounds adsorbed per unit weight of catalyst in this example than in Example I; about 25 mg. of N per gram of catalyst as compared to about 16.3 mg./gm.

The following example uses a longer contact time, showing that a short contact time of not more than about one hour is adequate to accomplish the bulk of the adsorption.

*Example III*

A portion of the light cycle oil containing 133 p.p.m. nitrogen was contacted with the regenerated cracking catalyst at 300° F. and a weight ratio of catalyst to oil of 0.05. After three and one-half hours the supernatant catalyst-free oil was found to contain 74 p.p.m. nitrogen. Thus, about 44% of the nitrogen compounds were adsorbed on the catalyst, representing the removal of only 6% more of the nitrogen compounds than in Example II, but in three and one-half times as much time.

The following example of treating a higher boiling feed shows that the process of this invention is most efficient for the removal of nitrogen compounds from only moderately high boiling hydrocarbon oils.

*Example IV*

A heavy cycle oil having a gravity of 24.6 degrees API, boiling from 561 to 845° F., and containing 1195 p.p.m. nitrogen was catalytically hydrogenated to remove the bulk of the nitrogen compounds by conversion to ammonia, and the nitrogen content of the oil was then adjusted to 150 p.p.m. by blending with a small portion of the unhydrogenated oil. The oil containing 150 p.p.m. nitrogen was contacted with the regenerated silica-alumina cracking catalyst at 300° F. at a catalyst-to-oil ratio of 0.05. After one hour the catalyst free supernatant oil was found to contain 121 p.p.m. nitrogen. Thus, only about 20% of the nitrogen compounds in the heavy cycle oil were adsorbed on the catalyst whereas, at the same treating conditions, nearly 40% of the nitrogen compounds were removed from the light cycle oil, in Example II.

The following example with a higher catalyst-to-oil ratio shows that the use of a low catalyst-to-oil ratio of less than about 0.1 is most efficient in the practice of this invention.

*Example V*

A portion of the heavy cycle oil containing 150 p.p.m. nitrogen was contacted with the regenerated cracking catalyst at 300° F. at a catalyst-to-oil ratio of 0.4. After one hour the catalyst-free supernatant oil was found to contain 100 p.p.m. nitrogen. Thus, 33% of the nitrogen compounds were adsorbed on the catalyst as compared to 20% in Example IV, but eight times as much catalyst was required per unit weight of oil.

In the above examples, the regenerated cracking catalyst used as the adsorbent had been stabilized by oxidation at 1100° F. When fresh catalysts or old hydrated catalysts were used, adsorption was less efficient, and the results were erratic and not reproducible with different batches of the same catalyst. Hence, it is important to use regenerated catalyst recently withdrawn from the cracking process.

In other tests at a contacing temperature of 400° F., the adsorption of nitrogen compounds on the silica-alumina cracking catalyst was considerably less effective. For example, only 10% of the nitrogen compounds were adsorbed from the heavy cycle oil at conditions comparable to those of Example IV except for the treating temperature. Best results are obtained at near ambient temperature, i.e., 50–90° F., but some added expense is then involved in cooling the regenerated cracking catalyst before or during contacting with the oil.

As described with reference to the diagram, and in the examples, the contacting of the oil containing nitrogen compounds with the portion of regenerated catalyst has been referred to generally as simple mixing. Up to 94% of the nitrogen compounds have been removed from an oil by adsorption in this way, in the practice of the invention, but with greater than the preferred ratio of catalyst to oil and contact time. For more efficient utilization of the catalyst-adsorbent, or to obtain more complete removal of the nitrogen compounds, several stages of contacting in series could be used in a well-known manner. Similarly, the oil and catalyst could be contacted in an upright vessel or tower by flowing the oil upwards countercurrent to downflowing catalyst. Multiple disengaging trays could be incorporated in the design of such a tower. Numerous other schemes for carrying out efficient contacting of solids and liquids will be recognized by those skilled in the art as applicable to the process. Similarly, it is contemplated that within the practice of the invention additional oil and/or catalyst treating steps may be incorporated—for example, to recover non-nitrogenous compounds from the catalyst before returning it to the catalytic cracking reaction zone—without departing from the essential concept of using the catalytic cracking process to remove the adsorbed nitrogen compounds.

I claim:
1. A process for lowering the nitrogen content of an oil from above 200 p.p.m. to below 10 p.p.m., which comprises:
   (1) passing a hydrocarbon oil containing above 200 p.p.m. nitrogen in nitrogen compounds through a first catalytic hydrogenation zone wherein a major portion of said nitrogen compounds is removed by hydrogenation to ammonia, and recovering liquid hydrogenated oil boiling below about 750° F. and reduced in nitrogen content to below 200 p.p.m.,
   (2) contacting said liquid hydrogenated oil with a portion of freshly regenerated cracking catalyst withdrawn from a catalytic cracking process, having a reaction zone and a regeneration zone between which catalyst is continuously circulated, forming a catalyst-oil mixture at conditions including a weight ratio of catalyst to oil below 0.1, temperature below 400° F., and sufficient contact time such that at least 10% of the nitrogen compounds is adsorbed on the catalyst,
   (3) separating said mixture into a slurry of oil and catalyst carrying adsorbed nitrogen compounds, and catalyst-free oil further reduced in nitrogen content,
   (4) passing said slurry to the reaction zone of said catalytic cracking process,
   (5) passing said catalyst-free oil through a second catalytic hydrogenation zone wherein, because of the foregoing removal of nitrogen compounds, the remaining nitrogen compounds are substantially removed by hydrogenation to ammonia more easily than in said first hydrogenation zone, and recovering oil reduced in nitrogen content to below 10 p.p.m. nitrogen.

2. The process of claim 1 wherein said hydrocarbon oil containing nitrogen compounds is a light cycle oil recovered from the catalytic cracking process.

References Cited by the Examiner

UNITED STATES PATENTS

| | | | |
|---|---|---|---|
| 3,055,823 | 9/62 | Mason et al. | 208—254 |
| 3,055,825 | 9/62 | Buningh et al. | 208—254 |

ALPHONSO D. SULLIVAN, *Primary Examiner.*